United States Patent [19]
Chiba et al.

[11] Patent Number: 6,111,566
[45] Date of Patent: *Aug. 29, 2000

[54] APPARATUS OF DATA DECOMPRESSION AND PROCESSING AND METHOD THEREFOR AND COMPUTER READABLE MEDIUM

[75] Inventors: Hirotaka Chiba; Tsugio Noda, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/896,603

[22] Filed: Jul. 18, 1997

[30] Foreign Application Priority Data

Jan. 31, 1997 [JP] Japan .................................. 9-019288

[51] Int. Cl.[7] ...................................................... G09G 5/00
[52] U.S. Cl. ........................ 345/202; 345/508; 345/507; 382/232; 382/233; 707/101
[58] Field of Search ..................................... 345/202, 507, 345/508, 501; 382/232, 233; 707/204, 100–101, 200, 104

[56] References Cited

U.S. PATENT DOCUMENTS

| | | | |
|---|---|---|---|
| 5,237,460 | 8/1993 | Miller et al. | 360/8 |
| 5,657,433 | 8/1997 | Murase et al. | 345/433 |
| 5,663,764 | 9/1997 | Kondo et al. | 348/414 |
| 5,724,070 | 3/1998 | Denninghoff et al. | 345/202 |
| 5,748,904 | 5/1998 | Huang et al. | 395/200.77 |
| 5,751,857 | 5/1998 | Kobayashi | 382/232 |
| 5,812,817 | 9/1998 | Hovis et al. | 711/173 |
| 5,862,347 | 1/1999 | Suzuki et al. | 709/247 |

*Primary Examiner*—Raymond J. Bayerl
*Assistant Examiner*—Sy D. Luu
*Attorney, Agent, or Firm*—Staas & Halsey, LLP

[57] ABSTRACT

The present invention relates to a data processing apparatus to display a virtual space and so on, and its object is to carry out a display process for three-dimensional data at high speed. The data processing apparatus is provided with a compressed data hold part for holding compressed data, a decompression processing part for decompressing the compressed data, a decompressed data hold means for holding decompressed data, a data management part for managing the compressed data and the decompressed data in pairs, and a data selection part for selecting and reading the decompressed data when data is requested to be outputted.

12 Claims, 11 Drawing Sheets

DATA MANAGEMENT TABLE T1

| COMPRESSED DATA HOLD | DECOMPRESSED DATA HOLD |
|---|---|
| A.wrl.gz | A.wrl |
| A001.jpg | A001.ras |
| A002.jpg | A002.ras |
| A003.jpg | A003.ras |

RELATION BETWEEN VIEWPOINT AND DATA

THREE-DIMENSIONAL
CITY (X-Y PLANE)

———— DECOMPRESSED DATA (DISPLAY)
– – DATA BEING DECOMPRESSED
    (TO DECOMPRESSED DATA HOLD PART)
······ COMPRESSED DATA BEING READ
    (TO COMPRESSED DATA HOLD PART)

VIEWPOINT

DATA MANAGEMENT TABLE T2

| COMPRESSED DATA HOLD | DECOMPRESSED DATA HOLD |
|---|---|
| A.wrl.gz | A.wrl |
| A001.jpg | A001.bmp |
| A002.jpg | A002.bmp |
| A003.jpg | A003.bmp |

FIG. 8(a)
Baseline JPEG
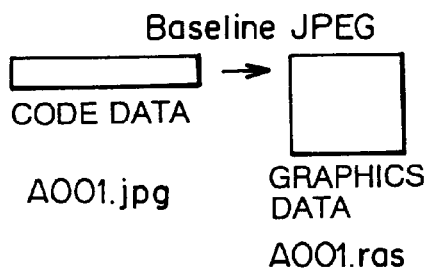
A001.jpg  →  A001.ras
CODE DATA    GRAPHICS DATA
FIG. 8(b)
Tiling JPEG
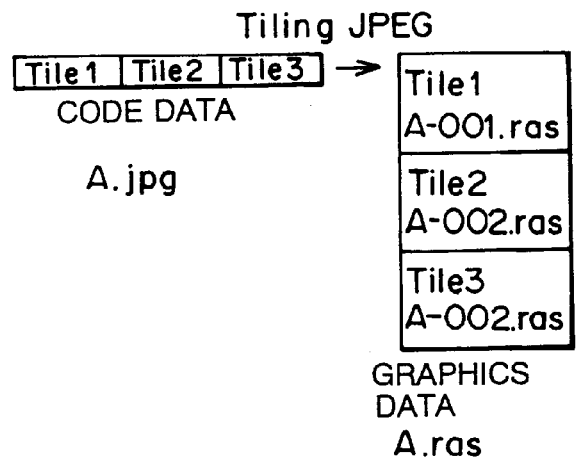
A.jpg
CODE DATA
GRAPHICS DATA
A.ras
FIG. 9
DATA MANAGEMENT TABLE T3
| FIRST DATA HOLD | | SECOND DATA HOLD |
|---|---|---|
| A.wrl.gz | | A.wrl |
| Tiling | | |
| A.jpg | A-001.jpg<br>A-002.jpg<br>A-003.jpg | A-001.ras<br>A-002.ras<br>A-003.ras |

EFFECTIVE
COEFFICIENT
DISTRIBUTION IN
IDCT OPERATION

EXTRACT EFFECTIVE
COEFFICIENT BY
RESTRICTING IDCT
OPERATION WITHIN DC

FIG. 14

DATA MANAGEMENT TABLE T4

| FIRST DATA HOLD | | SECOND DATA HOLD |
|---|---|---|
| A.wrl.gz | | A.wrl |
| | LAYER | |
| A.jpg | A-001.jpg<br>A-002.jpg<br>A-003.jpg | A-001.ras<br>A-002.ras<br>A-003.ras |
| B.jpg | B-jpg-001 | B-001.ras |

APPARATUS OF DATA DECOMPRESSION AND PROCESSING AND METHOD THEREFOR AND COMPUTER READABLE MEDIUM

BACKGROUND OF THE INVENTION

1. Field of the Invention

The present invention relates to a control method for display data, more particularly, relates to a data display control method to display compressed data from a data server in a network at high speed.

2. Description of the Related Art

As internet and the like come into wide use and a personal computer has a high performance in recent years, structured languages carrying out a three-dimensional virtual space (Virtual Reality Modeling Language: hereinafter, called VRML) come into wide use. In this system, the VRML is used for programming to structure a three-dimensional space, and then is stored in a server. A user accesses data stored in the server by a viewer to restructure the three-dimensional space from the VRML, and then the user restructures the three-dimensional space by a personal computer. With this arrangement, the user can walk through the three-dimensional space freely.

There has started to be use a virtual mall in which shops are open in this virtual space, and such a virtual space is shown in "Three-Dimensional Interactive Space AGORA linked to WWW, Harada et al., Joint Workshop of MIS•NA•OFS Study Groups in Electronics Information Communication Society, Sapporo, 18–19.9.1995".

The following is an outline to display a three-dimensional space.

First, VRML data are stored into a server in a network. When a server name and a VRML data are designated by a viewer set at a client, the client accesses the designated VRML data in the server, and receives the VRML data. Then, the client restructures the three-dimensional space with the received VRML data, whereby the user can walk through in this three-dimensional space freely. Further, to structure the three-dimensional space really, it is possible to structure the three-dimensional image close to the original by using a pattern image (texture image) on a surface of a three-dimensional object. When a capacity for the VRML data and the texture data becomes large, to reduce a communication time in a network, compressed data is stored in the server by using various data compression technology, and then the compressed data is decompressed by the client, whereby a three-dimensional image is displayed.

FIG. 15 shows an outline of a display control method between a server and a display client in the conventional network. As shown in FIG. 15, a server S and a client C are connected to each other via a network NW. In the server S, compressed data (VRML(.wrl.gz.), JPEG(.jpg)) is held. The compressed data held in a data hold part 21 is transmitted from a data supply part 22 to meet data requests from the client C.

A data request part 23 in the client C requires the server S to send data, and receives compressed data transmitted from the server S. Then, a data hold part 24 holds the compressed data once. Successively, when display is required, the data request part 23 reads compressed data required for display from the data hold part 24 and sends the data to a data decompression part 25. The data decompression part 25 decompresses the compressed data, and then transmits decompressed data to a three-dimensional display processing part 26. The three-dimensional display processing part 26 generates data for display, and transmits the data to a display unit not shown.

As shown in FIG. 15, conventionally, the client C is provided with the data hold part 24 for holding data received from the server S. When the following scene is similar to that already displayed, the scene is displayed with the data held in the data hold part 24. The data once received is held in the data hold part 24 in this way and is used, whereby a data transmitting time from the server S is reduced and a three-dimensional display process is carried out at high speed. In this case, data instructing display corresponds to a data name held in the data hold part 24.

When the data name instructed to be displayed indicates compressed data, the data hold part 24 also keeps the compressed data. When the three-dimensional display is performed, the compressed data held in the data hold part 24 is decompressed, and then is displayed.

For example, an image data processing system disclosed in Japan Patent Application Laid-Open No. 62-6854 in 1987 is provided with two compressed data caches, whereby data are transmitted at high speed in the system. In this system, compressed data are held in the data caches to improve a transmitting speed.

Further, structured data in which a number of texture pixels varies in accordance with distance data (Level of Detail: hereinafter, called LOD) are prepared, and various data are required in accordance with the LOD from the client C. That structure is shown in FIG. 16.

As shown in FIG. 16, compressed data are held by a data hold part 21a in the server S similarly to those in FIG. 15, namely, each compressed data is held in accordance with the value of the LOD. In FIG. 16, there are three cases in that the LOD is not more than 100, from 100 to 200, and not less than 200, compressed data which each corresponding image is compressed is held.

The client C requires the server S to transmit data corresponding to the LOD, whereby image data corresponding to the transmitted LOD is read from the data hold part 21a. The following processes are similar to those in FIG. 15.

Not many texture images are used for a far primitive, and many texture images are used for a close primitive. Although it is necessary to prepare plural data for the same primitive, a far primitive can be displayed with a little data quantity. Thus, it is possible to reduce the transmitting time and to carry out the display process at high speed.

Concerning the technology in that the data obtained by accessing the server S is stored in the data caches and the stored data is used for the following display, however, there is a possibility that the following problems occur. That is, the data stored in the data caches is kept as it is whether the data is compressed data or non-compressed data. Thus, when the data stored in the data caches is compressed data, it is necessary to apply the decompression process to the data for the display process every time, therefore, there is a problem to lower the speed of the display process.

Moreover, concerning the method in that the display is made high speed by requiring various data corresponding to the distance data LOD, it is necessary to prepare plural programmed data for one three-dimensional object in accordance with distances. Thus, it is necessary to prepare plural data to carry out high speed display.

SUMMARY OF THE INVENTION

Accordingly, it is an object of the present invention to solve those problems and to make a display process high speed.

To solve the above-mentioned problems, the present invention relates to a data processing apparatus. The data processing apparatus comprises a data receiving part, a compressed data hold part, a decompression processing part, a decompressed data hold part, a data management part, a data processing part, and a data selection part.

The data receiving part receives compressed data via a communication path. The compressed data hold part holds the compressed data received by the data receiving part. The decompression processing part decompresses a plurality of pieces of the compressed data held by the compressed data hold part. The decompressed data hold part holds a plurality of pieces of decompressed data which are decompressed by said decompression processing means. The data management means manages each of the compressed data held by the compressed data hold part and decompressed data which corresponds to each of the compressed data and which is held by the decompressed data hold part in a pair. The data processing part processes a piece of decompressed data. The data selection part selects and reads the decompressed data from the decompressed data hold part when the decompressed data which is needed for processing in the data processing part is in the decompressed data hold part and for supplying read data to the data processing part.

According to this arrangement, it is possible to hold data required for a display process in both of the compressed data hold part and the decompressed data hold part, therefore, the compressed data can be read from the decompressed data hold part when it is necessary to display the same data in future. Thus, it is possible to carry out the display process at a high speed when an image is displayed (particularly, in future).

In the data processing apparatus of the present invention, the data selection part, when a piece of the decompressed data needed for the processing in the data processing part is not held by the decompressed data hold part, reads the compressed data corresponding to the data from the compressed data hold part and supplies a piece of the compressed data to the decompression processing part, and register the decompressed data which is decompressed by the decompression processing part and corresponds to the compressed data in a pair.

According to this arrangement, even if no decompressed data is held by the decompressed data hold part, there is a possibility that no decompression process is merely applied, therefore, when the compressed data corresponding to the data to be displayed is held in the compressed data hold part, the decompression process may be applied to that compressed data. That is, it becomes unnecessary to request a server or the like to transfer compressed data.

In a data processing apparatus of the present invention, a data conversion part for converting a data format of the decompressed data decompressed by the decompression processing part may be further provided, and the decompressed data of which the data format is converted by the data conversion part is held by the decompressed data hold part.

According to this arrangement, it is possible to hold the decompressed data which is previously converted into data of a format used for the display process (intermediate data) in the compressed data hold part, so that it is not necessary to convert the data format at steps of the display process and the like. Thus, it is possible to carry out the display process at higher speed.

In a data processing apparatus of the present invention, a piece of linkage compressed data containing a plurality of pieces of compressed data is received by the data receiving part, and the data management part manages a linkage data name of the linkage compressed data held by the compressed data hold part so as to correspond to each compressed data name of the linkage compressed data.

According to this arrangement, it is possible to read relative data from a server or the like. The relative data may be read from the compressed/decompressed data hold parts, therefore, it is possible to prevent deterioration of an access time by communication protocol overheads caused by that the server is accessed several times.

In a data processing apparatus of the present invention, a decompression process designation part for designating a decompression process class by the decompression processing part may be further provided, and the decompression processing part applies a decompression process to the compressed data based on the decompression process class designated by the decompression process designation part.

When a decompressed process speed is regarded as the process class, it is possible to select whether the decompression process speed is given priority or not. When the user requests that an image is displayed quickly, the decompression process speed may be given priority, and when the image quality of the display image is given priority rather than the time until display, the process speed may be considered next.

The data selection part instructs the compression processing part to apply the decompression process to the compressed data at a first process speed, and after the decompression process at the first process speed, instructs the compression processing part to apply another decompression process to the compressed data at a second process speed lower than the first process speed.

In a data processing apparatus of the present invention, hierarchical compressed data containing a plurality of pieces of compressed data of different layers is received, and the data management part manages a hierarchical data name of the hierarchical compressed data held by the compressed data hold part so as to correspond to each compressed data name of the hierarchical compressed data.

In a data processing apparatus of the present invention, a first compressed data received by the data receiving part is decompressed by the decompression processing part and outputted, a second compressed data is received in parallel to outputting decompressed data of the first compressed data, a second compressed data is obtained by decompressing the second compressed data which is received by the data receiving part, and the second decompressed data is held by the decompressed data hold part.

According to this arrangement, even if no instruction such as display is given, the compressed data is sequentially decompressed and held, therefore, it is possible to prepare data required for display previously. Thus, it is possible to carry out processes such as a display process at higher speed substantially.

Moreover, the present invention relates to a data processing method. In the method, compressed data is received, the compressed data which is received is held, the compressed data which is held is decompressed, decompressed data is held, the compressed data which is held and the decompressed data corresponding to the compressed data are managed in pairs, the decompressed data is processed, and the decompressed data is selected and read when data is needed for processing.

BRIEF DESCRIPTION OF THE DRAWINGS

Other objects and advantages of the present invention will become apparent during the following discussion conjunction with the accompanying drawings, in which:

FIGS. 8(a) and 8(b) are views illustrating relations of a baseline JPEG and a tiling JPEG;

FIG. 9 is another data management table according to the third embodiment;

FIG. 14 is a data management table according to the fifth embodiment;

DETAILED DESCRIPTION OF THE PREFERRED EMBODIMENTS

Preferred aspects and embodiments of the present invention will now be described with reference to the accompanying drawings.

<First Embodiment>

Figure 1:
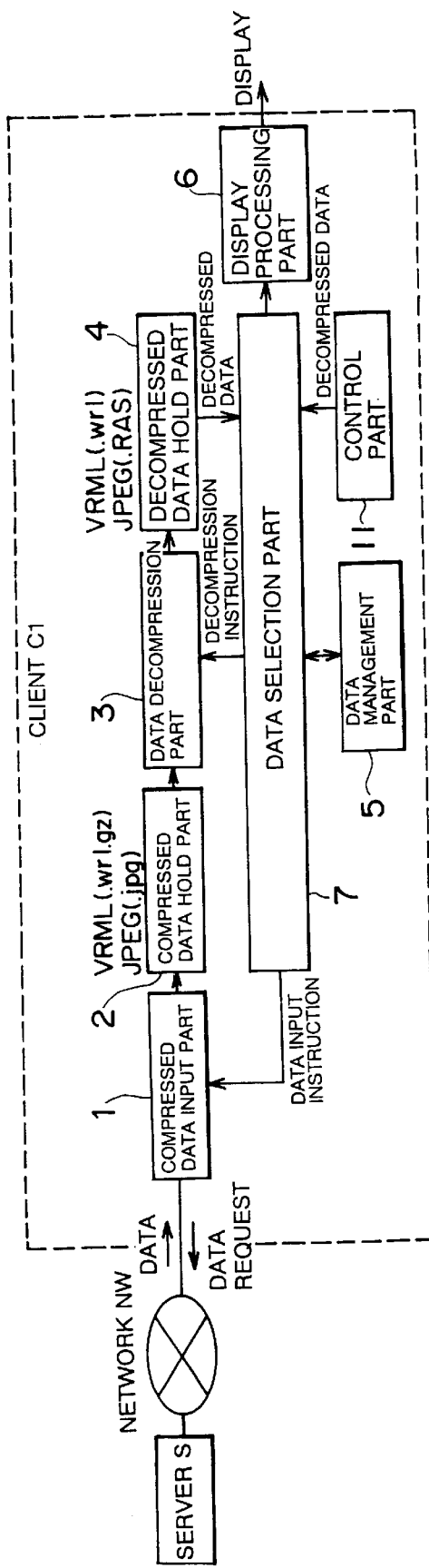
FIG. 1 is a structural view illustrating a client according to the first embodiment of the present invention.

FIG. 1 illustrates a client C1 according to the first embodiment of the present invention. The client C1 is connected with a server S via a network NW. The client C1 requests the server S to send data and receives various data from the server S on request.

As shown FIG. 1, the client C1 is provided with a compressed data input part 1, a compressed data hold part 2, a data decompression part 3, a decompression data hold part 4, a data management part 5, a display processing part 6, a data selection part 7 and a control part 11.

The compressed data input part 1 reads data from the server S via the network NW in accordance with a data input instruction signal sent from the data selection part 7. The data inputted via the compressed data input part 1 is held in the compressed data hold part 2 temporarily. Then, the compressed data held in the compressed data hold part 2 is sent to the data decompression part 3, and the in data decompression part 3, the decompression process is applied to the compressed data in accordance with a decompression instruction from the data selection part 7. The data decompressed in the data decompression part 3 is held by the decompressed data hold part 4. The data management part 5 manages data held in the compressed data hold part 2 and the decompressed data hold part 4 in pairs. The control part 11 requires the data selection part 7 to output data needed for display. The data selection part 7 checks up data required for display from the data management part 5. Then, the data selection part 7 reads the data held in the decompressed data hold part 4 or the required data from the server S, and sends them to the display processing part 6. The display processing part 6 restructures a three-dimensional image based on the decompressed data sent from the data selection part 7.

Now, the VRML data are compressed by the GZIP compression and the texture image data are compressed by the JPEG compression, and then the compressed data are registered in the server S. In FIGS. 1 through 15, (.wrl) is added to the VRML data and (.jpg) is added to the texture data for discrimination.

Figures 2, 3:
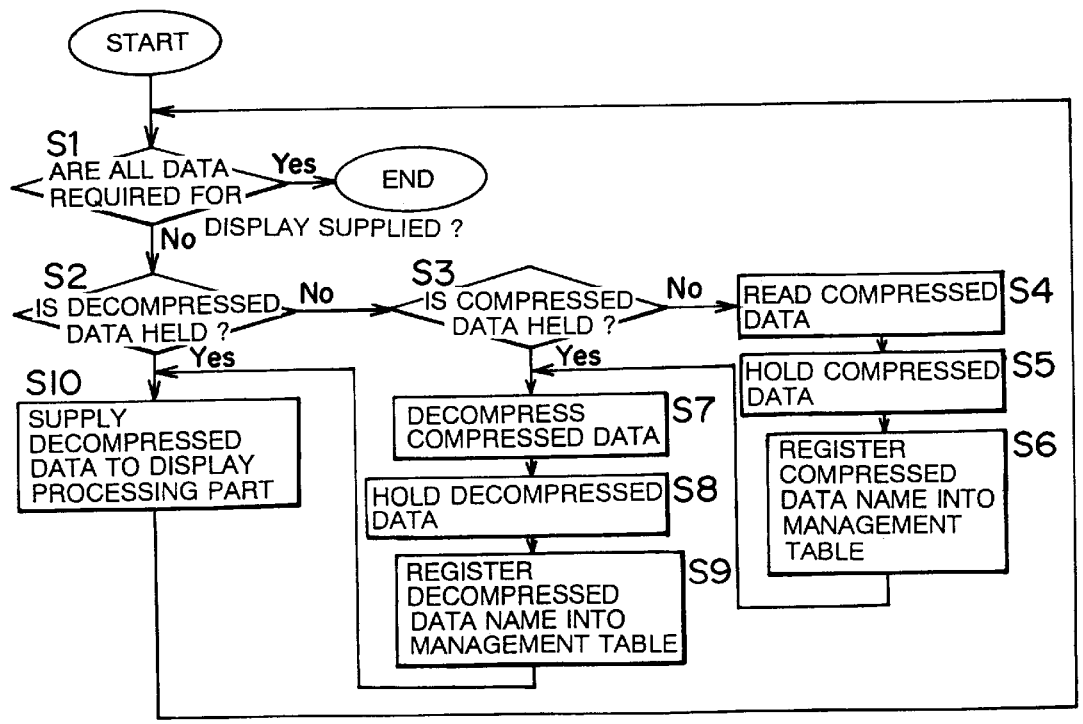
FIG. 2 is a data management table according to the first embodiment.
FIG. 3 is a flow chart illustrating a data processing procedure according to the first embodiment.

In the data management part 5, a data management table T1 shown in FIG. 2 is registered. In the data management table T1, the left side shows the compressed data held in the compressed data hold part 2, and the right side shows the compressed data held in the decompressed data hold part 4. The data management part 5 manages the compressed data and the decompressed data in pairs. In FIG. 2, it is assumed that the compressed data includes structural programmed data A.wrl and image data A001.jpg, A002.jpg and A003.jpg used therein. The "A.wrl.gz" indicates the compressed data and the "A.wrl" indicates the decompressed data. Both of them correspond each other. Similarly, the image data having the same number in the compressed data corresponds to that in the decompressed data.

FIG. 3 is a flow chart showing a process procedure according to the first embodiment. An explanation will be given with reference to FIG. 3.

Here, it is assumed that structural programmed data A.wrl and image data A001, A002, and A003 are required for the display process. On request for the display process from the control part 11, the data selection part 7 determines whether all data requested for image display are supplied to the display processing part 6 or (S1). When all data requested for image display not are not supplied, the data selection part 7 performs the following processes.

First, the data selection part 7 checks whether the structural programmed data A.wrl is held in the decompressed data hold part 4 or not (S2). When the decompressed data is already held in the decompressed data hold part 4, the decompressed data A.wrl is supplied to the display processing part 6 (S10). On the contrary, when it is determined that no decompressed data A.wrl is held in the decompressed data hold part 4 at S2, the data selection part 7 checks whether the compressed data A.wrl.gz corresponding to the decompressed data A.wrl is held in the compressed data hold part 2 or not. When the compressed data A.wrl.gz is stored in the compressed data hold part 2, the data selection part 7 instructs the data decompression part 3 to decompress the compressed data A.wrl.gz, and then the compressed data is decompressed (S7). Successively, the decompressed data A.wrl is held in the decompressed data hold part 4 (S8), and a decompressed data name "A.wrl" is registered in the data management table T1 (S9). Then, the data selection part 7 supplies the decompressed data to the display processing part 6 (S10).

When it is determined that no compressed data A.wrl.gz is held in the compressed data hold part 2, the data selection part 7 sends an instruction to the compressed data input part 1 so as to request data from the server S. With this instruction, the compressed data input part 1 reads the compressed data A.wrl.gz from the server S (S4). The compressed data A.wrl.gz which is inputted is held in the compressed data hold part 2 (S5), and then a compressed data name "A.wrl.gz" is registered in the data management table T1 (S6). Thereafter, the process is advanced to S7, and the decompressed data is supplied to the display processing part 6.

After the structural programmed data A.wrl is processed, the image data is processed in the same way.

When the decompressed data is once held in the decompression data hold part 4, the corresponding decompression data name is already registered in the data management table T1. Thus, when the following display process is performed, it is necessary only to read the decompressed data from the decompressed data hold part 4, so that it is unnecessary to apply the decompression process to the compressed data again. As the result, it becomes possible to carry out the display process at high speed by saving the time required for the decompression process in this case.

Figure 4:
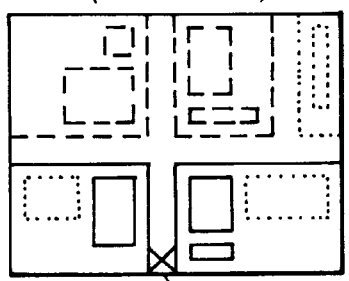
FIG. 4 is a view illustrating a relation between a viewpoint and data.

FIG. 4 illustrates a structural view of a three-dimensional city space on an X-Y plane. A viewpoint is a reference position for display. As shown in FIG. 4, a three-dimensional city is managed every region, and then data at a position close to the viewpoint is read earlier and data at a position separated from the viewpoint is read later, whereby it also becomes possible to display at higher speed.

In FIG. 4, full lines indicate data which are already decompressed and displayed on a screen. Long dotted lines indicate data which are already decompressed and held by the decompressed data hold part 4 but displayed on the screen. Short dotted lines indicate compressed data which have just been read from the server S or are held by the compressed data hold part 2.

It is necessary to display an image to make clear what exists around the viewpoint, therefore, the image around the viewpoint is displayed on the screen. When the user walks through the three-dimensional city, the image displayed on the screen varies in sequence. It is necessary to prepare data for image display, however, it is impossible to know which direction the user advances. Thus, concerning images at positions separated from the viewpoint to some extent, the image data is decompressed so as to be displayed at any time. In addition, since images at positions separated from the viewpoint to some extent are not so detailed, it is allowable that those images are not displayed actually in spite of images ahead of eyes.

Further, in FIG. 4, the data indicated by the short dotted lines show things at positions further separated from the viewpoint than the long dotted lines, and there are cases that those are hidden by a wall and so on, therefore, it is unnecessary to display them when the viewpoint exists at the position in FIG. 4, and it is also unnecessary to display them immediately when the viewpoint moves. Thus, concerning the data indicated by the short dotted lines, it is limited that the compressed data are held in the compressed data hold part 2, and the decompression process requiring a process time is carried out later.

As above described, the data at positions close to the viewpoint are supplied to the display processing part 6. Since there is a high possibility that the data of the middle distance are used for the following display, the compressed data are read from the compressed data hold part 2 and are previously decompressed so as to be sent to the decompressed data hold part 4. Further, concerning the data at positions separated from the viewpoint, the compressed data are read from the server S, and then held in the compressed data hold part 2 as they are. Thus, a data preparation process and a data display process can be carried out at the same time, and a high speed display process can be carried out for data required to be displayed when the viewpoint moves.

Now, an explanation will be given of the above-described three data demarcations.

In a WRL file, coordinate information of a three-dimensional primitive is programmed. It is also programmed which image file name is used for a textures to be a pattern on surfaces of the primitive. The client C1 accesses the WRL file stored in the server S. Then, the client C1 accesses image files to be required, whereby the data required for the three-dimensional image display is obtained. When the three-dimensional display is carried out, the data are controlled so as to vary in accordance with the viewpoint movement of the user at the client C1. The WRL file designation and the viewpoint movement are performed by the data selection part 7.

The data selection part 7 defines distance information A<B<C from the viewpoint to respective primitives at that time. It is assumed that the A, B and C designate respective distance ranges and theses ranges are any values. Then, the data selection part 7 accesses the image data in the server S based on the defined distance information.

First, the data selection part 7 requests the server S to send the image data required for display in a distance A closest to the viewpoint. That image data is received and decompressed immediately in the client C1, and then the decompressed image data is supplied to the display processing part 6. The display processing part 6 operates for three-dimensional display so as to display images.

Then, the data selection part 7 requests the server S to send the image data in a distance B, and then applies the decompression process to the received image data. It is not necessary to apply the display process to the image data in the distance B immediately, the decompressed image data in the distance B is not supplied to the display processing part 6 at that time but once held in the decompressed data hold part 4. The decompressed data which is held is read from the decompressed data hold part 4 when necessary, and then is supplied to the display processing part 6.

Next, the data selection part. 7 requests the server S to send the image data within a distance C. Concerning the image data within the distance C, it is not necessary to display the image data immediately, and there is a possibility that no display is required according to the movement of the viewpoint. The decompressed image data corresponding to the range within the distance C from the server S are held in the decompressed data hold part 2 but not supplied to the data decompression part 3. Thus, the compressed image data within the distance C are held by the client C1 as they are.

Now, when the user instructs to move the viewpoint, the distance relation between the viewpoint and the transferred image data varies, whereby, for example, all or a part of the image data corresponding to the range within the distance B become those within the distance A from the newly moved viewpoint. Thus, the data selection part 7 supplies the decompressed data which shift into the range of the distance A from the newly moved viewpoint to the display processing part 6 from among the decompressed image data held in the decompressed data hold part 4, and then carries out the three-dimensional image display.

Similarly, concerning the image in the range of the distance C at the initial viewpoint, the viewpoint is moved, whereby all or a part of the image data move to the position within the distance B (the distance A according to circumstances) from the new viewpoint. In this case, the data selection part 7 supplies the image data which shift into the range of the distance B from the newly moved viewpoint to the data decompression part 3 from among the decompressed data held in the decompressed data hold part 4, and then makes the data decompression part 3 hold the decompressed data. Thus, though the viewpoint moves further, the three-dimensional image can be displayed. Moreover, when it is necessary to request the server S to send image data as the viewpoint moves, the image data are sent in accordance with the movement of the viewpoint.

As above described, the data selection part 7 carries out the demarcation process according to the distance from the viewpoint based on the coordinate information set in the WRL file, the viewpoint information, and the predetermined condition of the distance from the viewpoint.

Additionally, it is possible to set the capacities for the compressed data hold part 2 and the decompressed data hold part 4 be not less than 0, therefore, the system demand can be satisfied, such as the storage capacity or the process speed is given priority in the client C1. Any capacity is set for each of the data hold parts 2, 4, whereby the client C1 can be structured suitably in accordance with the priority in the system.

For example, when the compressed data hold part 2 is provided but the decompressed data hold part 4, the decompressed data can not be held, so that the decompression process is required in sequence and it takes time for the decompression process. In this case, the data quantity of the compressed data is much smaller than that of the decompressed data, therefore, data corresponding to many images can be held in a small capacity.

On the contrary, when no compressed data hold part 2 is provided but the decompressed data hold part 4 is provided, the data quantity of the decompressed data is larger than that of the compressed data, therefore, the storage capacity is required to hold the decompressed data. In this case, the decompressed data can be held in the decompressed data hold part 4, therefore, when the display process is carried out with the decompressed data which are already held in the decompressed data hold part 4, it takes no time to decompress substantially. Thus, it becomes possible to carry out the display process at higher speed than the case that the decompression process is performed each time.

Moreover, when the data hold parts 2, 4 are filled up, old data and/or data rarely accessed are deleted based on the data management information, whereby space areas can be kept in the data hold parts without deleting all data, so that the system can be used continuously.

The data management part 5 manages each data quantity, the access times performed for display, and the last reading time besides the file names of the data held in the client C1. When there is no space area in the data hold parts 2,4, data to be deleted are selected based on that information managed by the data management part 5. It may be determined flexibly whether the data is deleted base on the access times or the passing time from the last access.

<Second Embodiment>

Figure 5:
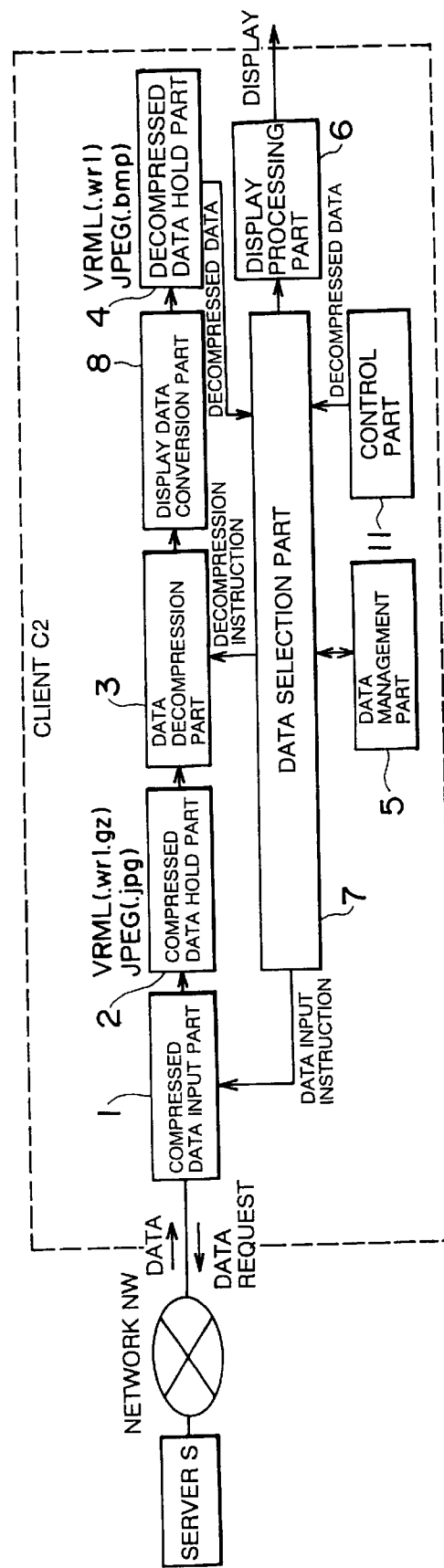
FIG. 5 is a structural view illustrating a client according to the second embodiment.

FIG. 5 shows the second embodiment. In FIG. 5, a display data conversion part 8 is added between the data decompression part 3 and the decompressed data hold part 4. The display data conversion part 8 converts the decompressed data by the data decompression part 3 into data which the display processing part 6 can directly use for the display process, such as restricted color data. The decompressed data converted by the display data conversion part 8 are held in the decompressed data hold part 4. The decompressed data are converted into optimal intermediate data which can be used by the display processing part 6, whereby the display process can be performed at high speed.

When each RGB color is expressed by 256 colors (8 bit), the full color image data can be expressed by 16.7 million colors. As to usual personal computers, there are few personal computers in which images can be actually displayed with 16.7 million colors because graphic memory capacities are limited and so on. Thus, a part of 16.7 million colors, such as 256 colors or 65 thousand colors are used to perform the pseudo full color display (restricted color display).

For the restricted color display, it is necessary to convert the image data expressed with the full color into the image data expressed with the restricted color, therefore, it takes a process time for this conversion. As the result, since the data is converted into the restricted color image data each image to carry out the display process in the display processing part 6, it takes time until the image is displayed.

In the second embodiment, therefore, concerning the image data decompressed by the data decompression part 3, the display data conversion part 8 converts the image data expressed with the full color into the image data expressed with the restricted color. That is, the display data conversion part 8 generates the intermediate image data from the original image data.

As above stated, the image data is decompressed not simultaneously with the image display process, and there is data which is only held in the decompressed data hold part 4. Thus, concerning the image data which is once held by the decompressed data hold part 4, the display data conversion part 8 converts the data format previously, whereby it is possible to shorten the process time in the display processing part 6 when the image is displayed actually, so that it becomes possible to display a three-dimensional image in a short time.

Figures 6, 7:
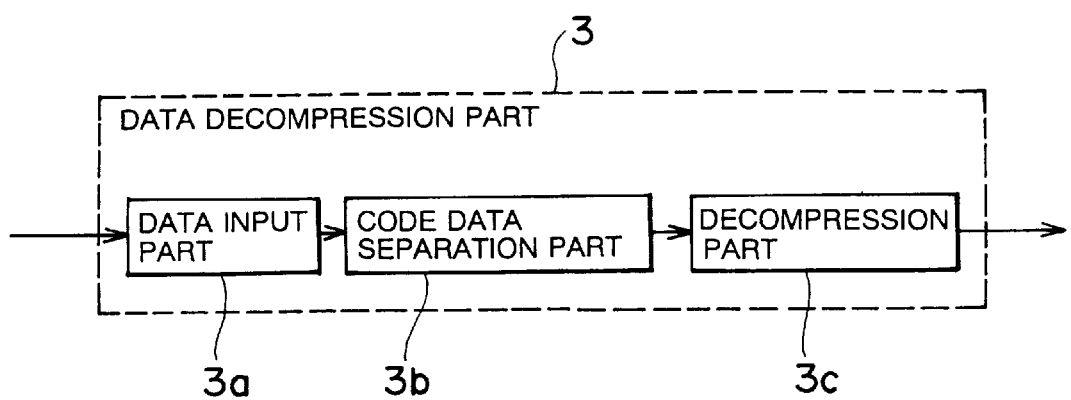
FIG. 6 is a data management table according to the second embodiment.
FIG. 7 is a structural view illustrating a data decompression part according to the third embodiment.

FIG. 6 shows a data management table T2 managed by the data management part 5 in FIG. 5. In FIG. 6, "compressed data hold" indicates the compressed data held by the compressed data hold part 2, and "decompressed data hold" indicates the decompressed data held by the compressed data hold part 4. The image data name of the compressed data is set such as 'A001.jpg', and this name means that the data is compressed by the JPEG. The data name of the decompressed data of which the data format is converted by the display data conversion part 8 is set such as 'A001.bmp', and this name means that the data format is converted for the restricted color.

<Third Embodiment>

FIG. 7 shows the third embodiment. FIG. 7 is a view showing a detailed structure of the data decompression part 3. As shown in FIG. 7, the data decompression part 3 is provided with a data input part 3a, a code data separation part 3b and a decompression part 3c. The data input part 3a reads the compressed data held by the compressed data hold part 2. The code data separation part 3b separates a BASELINE code data from the TILING JPEG code data read via the data input part 3a. The decompression part 3c sequentially decompresses the BASELINE code data separated by the code data separation part 3b so as to output them.

According to the JPEG graphics compression, as shown in FIG. 8(a), one image corresponds to one code data (A001.jpg) in the BASELINE compression. In this case, when the compressed data A001.jpg is decompressed, the image data A001.ras is obtained. As the TILING JPEG shown in FIG. 8(b), plural image data may be expressed as one code data. In this case, data Tile 1, Tile 2 and Tile 3 tiled for the code data A.jpg accompany. The code data A.jpg is decompressed by the TILING JPEG, whereby the image data Tile 1, Tile 2 and Tile 3 can be obtained. Data names are given to image data, as A-001.ras is given to the Tile 1, A-002.ras is given to the Tile 2 and A-003.ras is given to the Tile 3. A.ras is given to the image data as a data name corresponding to A.jpg.

In this case, the tiled compressed image data including plural images is registered in the server S. The relation between the tiled compressed data and each data name of the image data is previously determined as a corresponding rule in which the front portion (A in FIG. 8(b)) of the data name shows the tiled compressed image data and the rear portion (001 and the like in FIG. 8(b)) shows each image data.

According to this corresponding rule, the tiled compressed data name (A.jpg) is obtained from each compressed image data (A-001.jpg), and the tiled compressed image data (A.jpg) in the server S is accessed. The compressed image data A-002.jpg, A-003.jpg can be also obtained from the server S in this way.

When the compressed image data is accessed, the compressed image data which is accessed is once held by the compressed data hold part 2. As shown in FIG. 9, in a table management table T3, data is registered as a group including tiled compressed data A.jpg and all image data A-001.jpg, A-002.jpg, A-003.jpg (column "first data hold" in FIG. 9). The VRML data name (A.wrl.gz) is registered as a group.

When the image display process is required, the data names registered in the data management table T3 are referred, and then the decompression process and display process are performed for the required image data. For example, when the display process is required for A-002.jpg, the data selection part 7 refers to the data management table T3 so as to confirm where the data corresponding to A-002.ras is stored. In this embodiment, since the data A-002.jpg is already held by the compressed data hold part 2, the data selection part 7 decompresses the image data (A-002.jpg) held by the compressed data hold part 2 in the data decompression part 3, and then makes the decompressed data hold part 4 hold the decompressed data and send them to the display processing part 6. The decompressed data name A-002.ras is also registered in the data management table T3.

In the above explanation, the decompression process from A-002.jpg to A-002.ras is performed at the time that the image display process is required, however, the decompression process for another compressed data (such as, A-001.jpg, A-001.jpg) may be performed in parallel while the display process for A-002.jpg is performed. In this case, when the image data A-001.ras, A-002.ras are required later, it is unnecessary to carry out the image decompression process just before the display process. Thus, it is possible to shorten a time until images are displayed.

<Fourth Embodiment>

Figure 10:
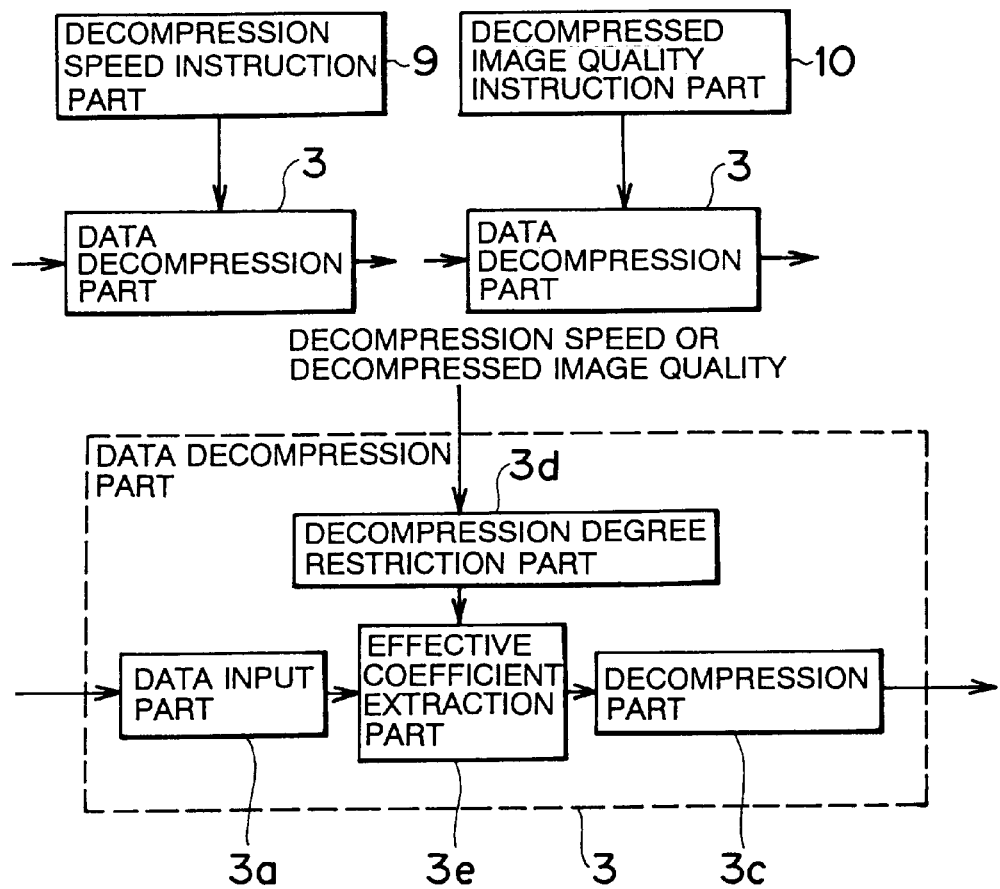
FIG. 10 is a structural view illustrating a data decompression part according to the fourth embodiment.

FIG. 10 shows the fourth embodiment of the present invention. In the fourth embodiment, a decompression speed instruction part 9 or a decompression image quality instruction part 10 is added to the first embodiment in FIG. 1. The data decompression part 3 is provided with a data input part 3a, a decompression degree restriction part 3d, an effective coefficient extraction part 3e and a decompression part 3c.

When the image data is compressed by the JPEG compression, the restriction of the decompression process is instructed by the decompression speed instruction part 9 or the decompression image quality instruction part 10. Then, the decompression degree restriction part 3d converts that instruction information into decompression degrees. The decompression speed is instructed whether the decompression process is performed at high speed or at low speed. The decompressed image quality is instructed whether the decompressed image data is made to be high image quality or low image quality. Both of the decompression speed and the decompressed image quality are relevant to each other. When the decompression process is performed at high speed, the image quality of the decompressed image becomes relatively low, and when it is necessary to decompress a high quality image, it takes relatively long time for the decompression process.

In the decompression process for the JPEG compressed data, since the inverse discrete cosine transform (IDCT) takes most of the process time, the time required for this transform is reduced, whereby it is expected that the process time is shortened substantially. For example, it is possible to operate easily density values in a block of 8×8 pixels by performing the shift operation in the DC portion without accurate operation of the IDCT though the image quality lowers slightly. Moreover, the effective operation area for the IDCT is restricted, whereby it is possible to operate at high speed though the image quality lowers similarly. The decompression degree restriction part 3d instructs the effective coefficient extraction part 3e to extract an effective coefficient to the required degree, whereby it is possible to decompress the image at high speed. Further, after the initial display, the data are decompressed and the image data for display are changed sequentially, whereby it is possible to carry out the high speed display in that an initial display is obtained quickly and display which becomes detail sequentially is obtained.

Figures 11A, 11B:
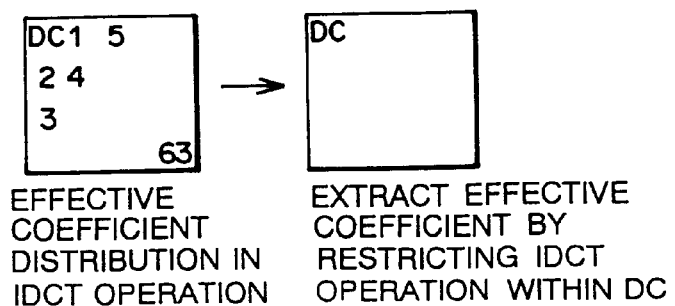
FIGS. 11(a) and 11(b) are explanatory views illustrating an ICDY operation.

When a block has 8×8 pixels, as shown in FIG. 11(a), there are 64 effective coefficients for one block (in FIG. 11(a), a part of them is omitted). The relation between the decompression speed and the number of the effective coefficients is as follows. When the decompression speed is maximum, the number of the effective coefficients to be extracted is 1, and when the decompression speed is minimum, the number of the effective coefficients to be extracted is 64. Similarly, the relation between the image quality and the number of the effective coefficients is as follows. When the image quality is highest, the number of the effective coefficients to be extracted is 64, and when the image quality is lowest, the number of the effective coefficients to be extracted is 1.

For example, when the coefficient is restricted to the DC component for the IDCT operation, as shown in FIG. 11(b), the DC component is extracted as an effective coefficient.

Additionally, when the high image quality (low speed process) is selected, it is not possible to display an image on a screen until the decompression process is completed, however, it is possible to display the image on the screen relatively quickly when the image quality is not cared.

<Modification>

Then, this embodiment can be modified as follows.

First, in the decompression process, when the initial display is carried out, the lowest image quality (maximum speed) is designated as the decompression instruction for the image data, the compressed data held by the compressed data hold part 2 is supplied to the data decompression part 3, and then the decompression process is applied. Then, all image data required to display images are decompressed, and the decompressed data are stored once in the decompressed data hold part 4 and supplied to the display processing part 6, whereby the display process is carried out. In this case, although the image quality is not good, the process speed is fast, so that the image can be displayed quickly.

Then, after performing this process, the decompression process of the highest image quality (lowest speed) is applied to the same image data. In this case, the decompression process of the highest image quality is carried out, the compressed data held by the compressed data hold part 2 is supplied to the data decompression part 3 again, and then the data decompression process is performed so as to be the highest image quality. The decompressed data which have been held by the decompressed data hold part 4 are changed for the image data decompressed in this way, and the decompressed data hold part 4 holds the changed data. The data selection part 7 supplies the decompressed data which are changed to the display processing part 6. Thus, the image displayed on the screen is changed from an image of the lowest image quality to that of the highest one.

These processes are carried out, whereby it is possible to display images to be displayed quickly on the screen. Moreover, the decompression process of the highest image quality is carried out while the display process of the low image quality is performed, whereby it is possible to shorten time until the image of the highest image quality is obtained.

The instruction of the image quality should not be limited to the two steps including the lowest image quality and the highest image quality, therefore, the decompression process can be divided into three steps or more in a manner that images of intermediate image qualities can be displayed.

<Fifth Embodiment>

Figure 12:
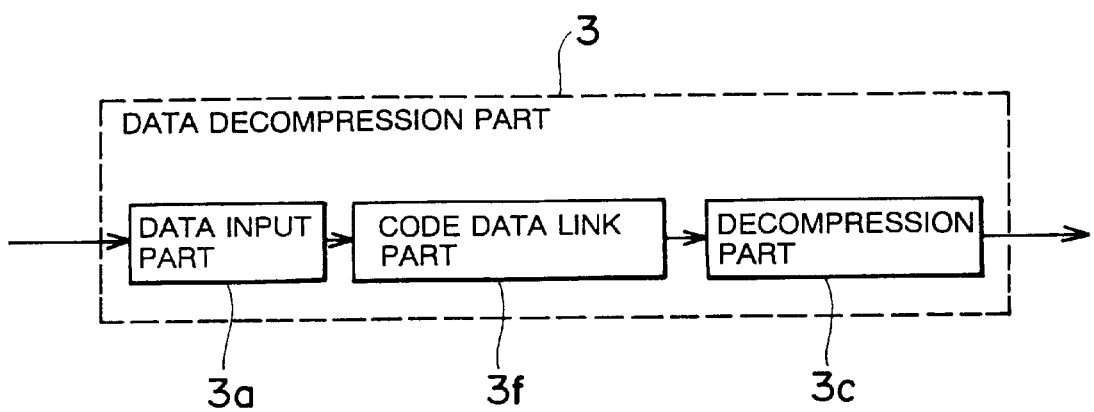
FIG. 12 is a structural view illustrating a data decompression part according to the fifth embodiment.

FIG. 12 shows the fifth embodiment of the present invention. The data decompression part 3 is provided with a data input part 3a, a code data link part 3f and a decompression part 3c.

Figure 13:
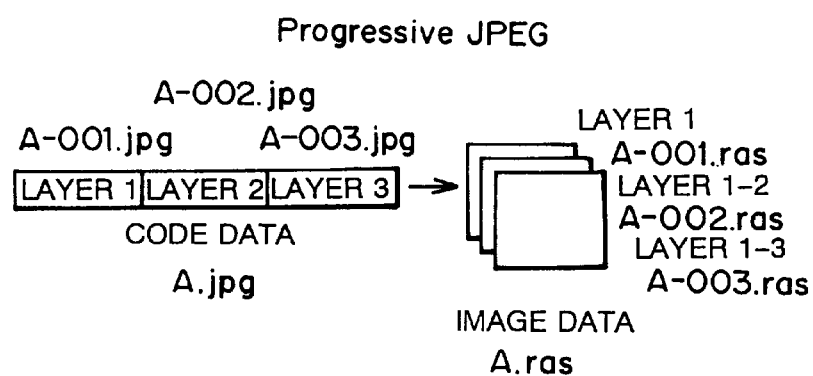
FIG. 13 is an explanatory view illustrating a progressive JPEG.
Figure 15:
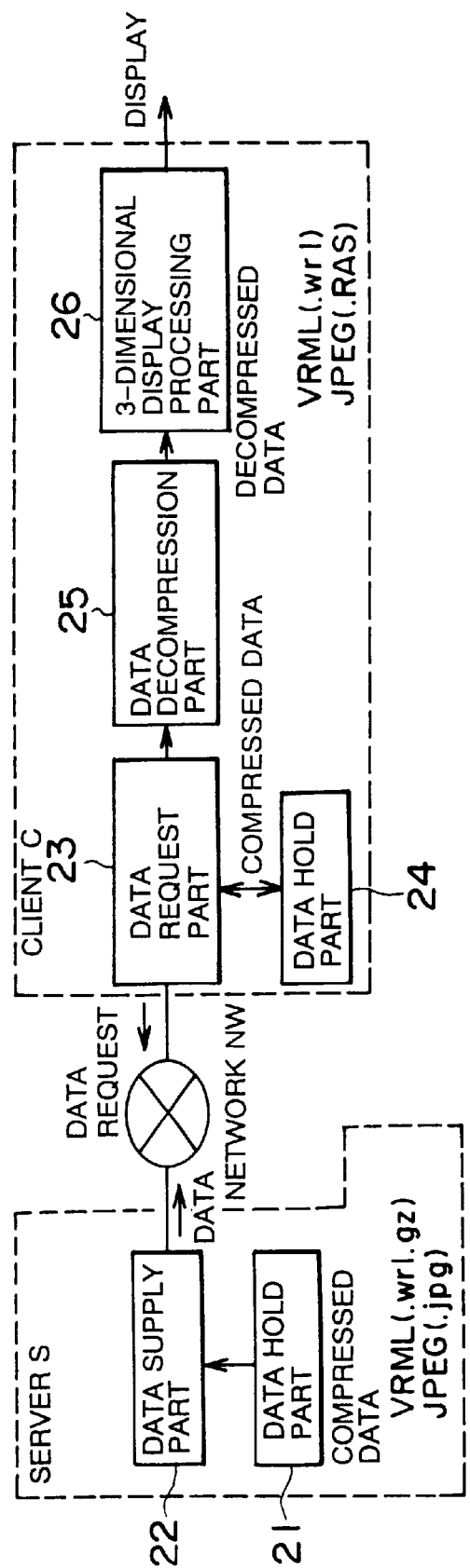
FIG. 15 is a structural view illustrating a conventional server-client system.
Figure 16:
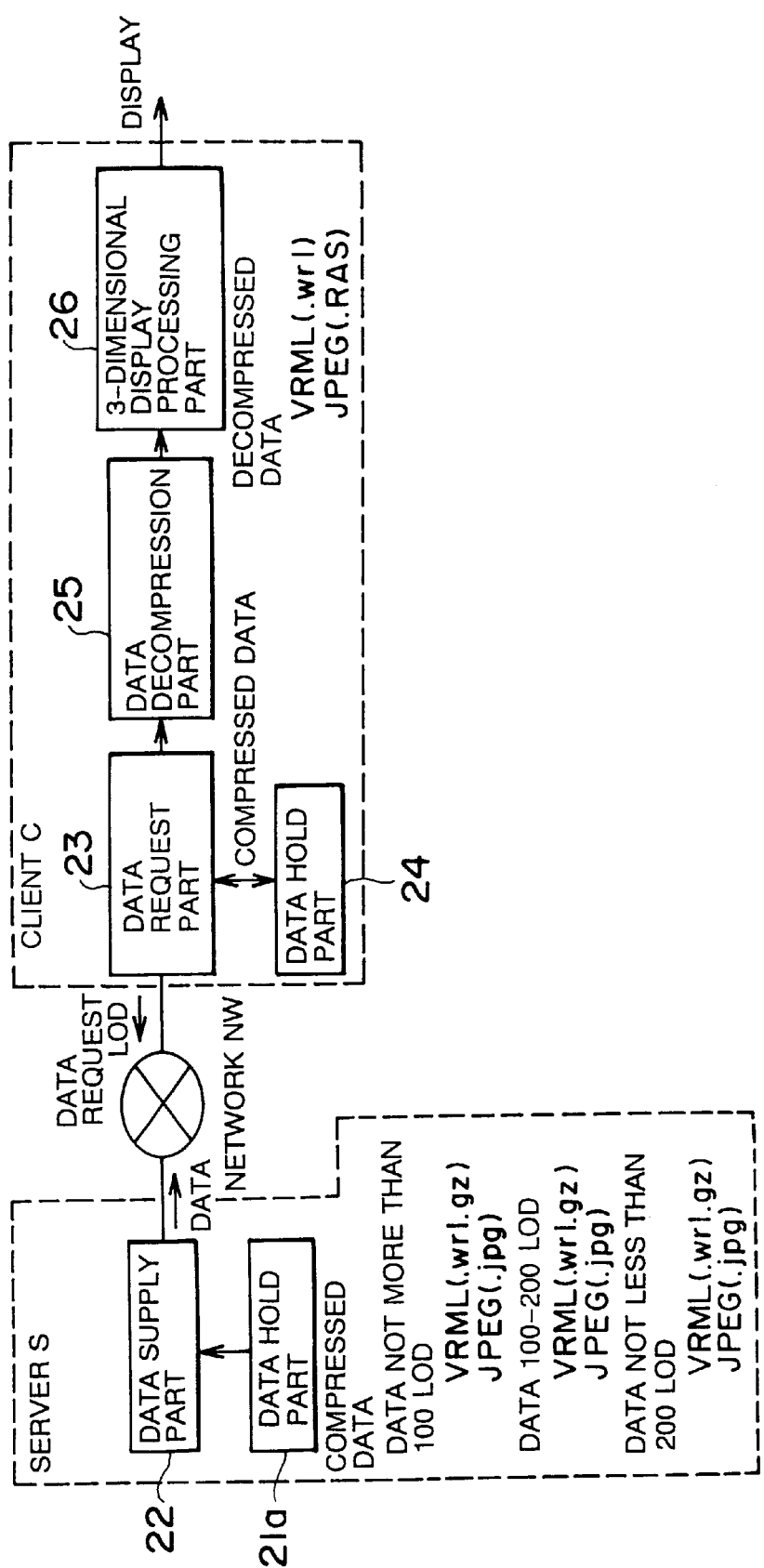
FIG. 16 is a structural view illustrating another conventional server-client system.

The compressed data of the decompressed data A.ras in the BASELINE JPEG is indicated by A.jpg. In the PROGRESSIVE JPEG in which the hierarchical decompression can be carried out, the layers of the effective coefficient are decompressed hierarchically, whereby the more detailed image can be displayed sequentially. In the PROGRESSIVE JPEG, for example, as shown in FIG. 13, hierarchical data 1, 2, 3 are accompanied to the code data A.jpg. A data name A-001.jpg is given to the image data in the hierarchy 1. Similarly, data names A-002.jpg, A-003.jpg are given to the image data in the layers 2, 3, respectively. When the code data A.jpg is decompressed, the image data A.ras can be obtained. Then, data names A-001.ras, A-002.ras, A-003.ras are given to the image data in the layers 1, 2, 3, respectively.

Those data names are managed so as to correspond to one another in a data management table T4 shown in FIG. 14. In the "first data hold" column, the data name A.jpg of the code data corresponds to the hierarchical data names A-001.jpg . . . .

In this embodiment, the data layers are adjusted with the LOD levels. For example, DC is used as an effective coefficient for a layer when the LOD is not less than 200, AC1–AC2 are used as effective coefficients for a layer when the LOD is between 100 and 200, and AC3–AC63 are used as effective coefficients for a layer when the LOD is not more than 100. Then, the IDCT is operated in accordance with those. The DC and ACn indicate effective coefficients, respectively. Each data corresponds to a suffix (001, 002, 003) at the rare portion of the data name. That is, when the LOD is not less than 200, the effective coefficient is only the DC component, therefore, the image quality of the reproduced image lowers. On the contrary, when the LOD is not more than 100, there are many effective coefficients, therefore, it is possible to obtain finer images though it takes long time for the operation.

Now, an explanation will be given of the relation between a distance from a viewpoint and a subject to be displayed. When the subject exists at a position closest to the viewpoint, the display size becomes large relatively, therefore, it is necessary to display images in detail. When the subject exists at a position separated from the viewpoint, the display size becomes small relatively. Thus, it is not a problem that the image quality is slightly rough and the detail is not reproduced so accurately when the subject exists at a position separated from the viewpoint.

Thus, in this embodiment, the layer is varied in accordance with the distance from the viewpoint and the accuracy of the image decompression process is varied for each layer. The image data for each layer can be obtained not by preparing the image data for each layer in the server S but by varying the operation accuracy when the same compressed data are decompressed.

Based on the file name and the LOD of the compressed image required for display, the image data name is converted into a data name indicating a corresponding hierarchial compressed data, and then the server S is required to send data. In the data management part 5, display image data names and hierarchial compressed image data names are managed in pairs.

For example, to display an image of one level, the client requests the server to transfer hierarchial data (compressed image data) corresponding to the LOD level. According to this, the compressed image data of the corresponding layer are read from the server S, and then are decompressed in the data decompression part 3, thereafter, the display process is performed.

When the LOD varies such as the viewpoint moves, image data of a new layer is required. In this case, the server is required to transfer compressed image data corresponding to this layer. Then, that image data is decompressed with the already held hierarchial data in the data decompression part 3, and the display process is performed.

As above described, the layers of the compressed image data required to the server S are limited with the distance information LOD by the client, therefore, it is not necessary to prepare plural image data corresponding to the distance information for the same three-dimensional subject in the server S. Further, the client reads only the hierarchial compressed image data of layers required for display and manages them. When the display layer varies, it is possible to display images at high speed only by transferring the difference between the hierarchial compressed data which does not exist in a cache and the hierarchial compressed image data which is managed.

Moreover, after the image corresponding to the LOD of one level is displayed, it is also possible to request the server S to transfer data of the following LOD level previously before changing into the following LOD level. According to this procedure, the corresponding image data has been already obtained when the LOD level is actually changed into the following LOD level, therefore, it is not necessary to request the server to transfer data when the LOD level changes. Thus, the process time to display images is shortened, whereby it is possible to carry out the display process at high speed.

This invention being thus described, it will be obvious that same may be varied in various ways. Saturations are not to be regarded as departure from the spirit and scope of the invention, and all such modifications would be obvious for one skilled in the art intended to be included within the scope of the following claims.

What is claimed is:

1. A data processing apparatus comprising:

a data receiving unit receiving compressed image data via a communication path;

a storage area partitioned into
a compressed data hold unit holding the compressed image data received by said data receiving unit, and
a decompressed data hold unit holding decompressed data;

a decompression processing unit decompressing the compressed image data held by said compressed data hold unit to produce the decompressed data held by said decompressed data hold unit;

a data processing unit performing an image display process using specified decompressed image data related to the image display process while other decompressed image data relating to the image display process are prepared in said decompressed data hold unit, by using corresponding decompressed image data when said decompressed data hold unit holds the corresponding decompressed image data, and by using corresponding compressed image data when the corresponding decompressed image data is not held by said decompressed data hold unit and said compressed data hold unit holds the corresponding compressed image data; and a setting unit setting storage capacities of said compressed data hold unit and said decompressed data hold unit with a ratio of the storage capacity of said compressed data hold unit to the storage capacity of the decompressed data hold unit being greater than one when the storage capacity of the compressed data is in preference to a speed of the image display process and being less than one when the speed of the image display process is in preference to the storage capacity of the compressed data.

2. A data processing apparatus according to claim 1, wherein said data receiving unit receives the corresponding compressed image data when said compressed data hold unit does not hold the corresponding compressed image data, and said data processing unit performs the image display process by using the corresponding compressed image data.

3. A data processing apparatus according to claim 1, further comprising a data conversion unit converting a data format of the decompressed image data, decompressed by said decompression processing unit, expressed full color into a data format of decompressed image data expressed restricted color before this decompressed image data expressed restricted color is specified as the specified decompressed image data.

4. A data processing apparatus according to claim 1, wherein said data receiving unit receives tiling image data including a plurality of compressed image data,
wherein said compressed data hold unit holds the tiling image data, and
wherein when part of the compressed image data within the tiling image data is decompressed to perform the image display process, at least one other part of the compressed image data included in the tiling image data is decompressed.

5. A data processing apparatus according to claim 1,
further comprising a decompression process designation unit designating a decompression process class by said decompression processing unit; and
wherein said decompression processing unit applies a decompression process to the compressed data based on the decompression process class designated by said decompression process designation unit.

6. A data processing apparatus according to claim 1, wherein said decompression processing unit decompresses the compressed image data by a first process and thereafter, when the same compressed image data is decompressed, said decompression processing unit decompresses the same compressed image data by a second process having a decompression speed slower than the first process, but the second process produces an image quality higher than the first process.

7. A data processing apparatus according to claim 1,
wherein the compressed image data represents an image of an object from a viewpoint; and
further comprising a progressive control unit controlling progressive display of the image of the object using the decompressed image data decompressed by said decompression processing unit, according to a distance between the viewpoint and the object.

8. A data processing apparatus according to claim 1, wherein a piece of first compressed data received by said data receiving unit is decompressed by said decompression processing unit and outputted, a piece of second compressed data is received in parallel to outputting decompressed data of the first compressed data, a second compressed data is obtained by decompressing the second compressed data which is received by said data receiving unit, and the second decompressed data is held by said decompressed data hold unit.

9. A data processing method, comprising:

partitioning a storage area into a first storage area for compressed data and a second storage area for decompressed data, each having a storage capacity, with a ratio of the storage capacity of the first storage area to the storage capacity of the second storage area being greater than one when the storage capacity for the compressed data is in preference to a speed of the image display process and being less than one when the speed of the image display process is in preference to the storage capacity for the compressed data;

receiving compressed image data;

holding the compressed image data in the first storage area;

decompressing the compressed image data which is held to produce decompressed image data;

holding the decompressed image data in the second storage area;

performing an image display process using specified decompressed image data while other decompressed image data relating to the image display process is prepared, when the specified decompressed data is already held; and performing the image display process using corresponding compressed image data when the specified decompressed image data is not held and the corresponding compressed data corresponds to the specified decompressed image data and is already held.

10. A computer readable medium storing a program to control a computer, said program comprising:

partitioning a storage area into a first storage area for compressed data and a second storage area for decompressed data, each having a storage capacity, with a ratio of the storage capacity of the first storage area to the storage capacity of the second storage area being greater than one when the storage capacity for the compressed data is in preference to a speed of the image display process and being less than one when the speed of the image display process is in preference to the storage capacity for the compressed data;

receiving compressed image data;

holding the compressed image data in the first storage area;

decompressing the compressed image data which is held to produce decompressed image data;

holding the decompressed image data in the second storage area;

performing an image display process using specified decompressed image data while other decompressed image data relating to the image display process is prepared, when the specified decompressed data is already held; and performing the image display process using corresponding compressed image data when the specified decompressed image data is not held and the corresponding compressed data corresponds to the specified decompressed image data and is already held.

11. A data processing apparatus according to claim 1, further comprising:

a decompression degree control unit to provide a decompression degree instruction corresponding to a speed of the image display process is requested; and wherein said decompression processing unit receives the decompression degree instruction and changes the speed of the decompression process according to the decompression degree instruction.

12. A data processing apparatus comprising:

a data receiving unit receiving compressed image data via a communication path;

a storage area partitioned into a compressed data hold unit holding the compressed image data received by said data receiving unit, and a decompressed data hold unit holding decompressed data;

a decompression processing unit decompressing the compressed image data held by said compressed data hold unit; to produce the decompressed data held by said decompressed data hold unit;

a data processing unit performing an image display process by using specified decompressed image data related to the image display process; and a setting unit setting storage capacities of said compressed data hold unit and said decompressed data hold unit with a ratio of the storage capacity of said compressed data hold unit to the storage capacity of the decompressed data hold unit being greater than one when the storage capacity of the compressed data is in preference to a speed of the image display process and being less than one when the speed of the image display process is in preference to the storage capacity of the compressed data, wherein the data processing unit performs, when a decompressed image data corresponding to the specified decompressed data is held by said decompressed data hold unit, the image display process by using the corresponding decompressed image data, and performs, when the corresponding decompressed image data is not held by said decompressed data hold unit and a compressed image data corresponding to the corresponding decompressed image data is held by said compressed data hold unit, the image display process by using the corresponding compressed image data; and wherein said data processing unit performs the image display process by using the specified decompressed image data while another decompressed image data relating to the image display process is prepared in said decompressed data hold unit.

* * * * *